(12) United States Patent
Shostak

(10) Patent No.: US 8,179,979 B2
(45) Date of Patent: May 15, 2012

(54) DETECTION AND COMPENSATION OF DISCONTINUITIES IN DATA STREAM

(75) Inventor: Nikolai Shostak, Moscow (RU)

(73) Assignee: Intel Corporation, Santa Clara, CA (US)

( * ) Notice: Subject to any disclaimer, the term of this patent is extended or adjusted under 35 U.S.C. 154(b) by 1414 days.

(21) Appl. No.: 11/799,511

(22) Filed: May 1, 2007

(65) Prior Publication Data

US 2008/0273590 A1  Nov. 6, 2008

(51) Int. Cl.
*H04N 7/12* (2006.01)

(52) U.S. Cl. ......... 375/240.26; 375/240.27; 375/240.28; 375/240.29

(58) Field of Classification Search . 375/240.26–240.29
See application file for complete search history.

(56) References Cited

U.S. PATENT DOCUMENTS

| | | | | |
|---|---|---|---|---|
| 5,652,627 | A | * | 7/1997 | Allen ............................ 348/497 |
| 5,875,354 | A | * | 2/1999 | Charlton et al. ................ 710/61 |
| 6,356,312 | B1 | * | 3/2002 | Lyu ............................... 348/512 |
| 6,993,081 | B1 | * | 1/2006 | Brunheroto et al. ...... 375/240.28 |
| 7,031,348 | B1 | * | 4/2006 | Gazit ............................ 370/504 |
| 7,058,721 | B1 | * | 6/2006 | Ellison et al. ................. 709/231 |
| 7,343,291 | B2 | * | 3/2008 | Thumpudi et al. ............ 704/500 |
| 7,885,366 | B2 | * | 2/2011 | Fuchikami et al. ........... 375/371 |
| 2003/0066094 | A1 | * | 4/2003 | van der Schaar et al. ..... 725/151 |
| 2008/0317246 | A1 | * | 12/2008 | Manders et al. ............... 380/37 |
| 2009/0080539 | A1 | * | 3/2009 | Alekseenko ............ 375/240.28 |

* cited by examiner

*Primary Examiner* — Benjamin Lanier
(74) *Attorney, Agent, or Firm* — Trop, Pruner & Hu, P.C.

(57) ABSTRACT

In one embodiment of the invention, a method includes receiving a video stream that includes a temporal discontinuity. Checkpoints are distributed in a non-linear fashion with unequal spacing between the checkpoints. The temporal discontinuity is then detected at one of the checkpoints.

20 Claims, 2 Drawing Sheets

DETECTION AND COMPENSATION OF DISCONTINUITIES IN DATA STREAM

BACKGROUND

Data streams, such as those formatted according to the second standard of the Motion Pictures Expert Group (MPEG2) and similar media containers, may contain temporal discontinuities in time stamps. Discontinuities may be produced by a Digital Video Disc (DVD) encoder or hardware encoder. Producing a discontinuity may have the effect of "zeroing" a time stamp in the data stream. This may occur when, for example, a time field has a limited bit-length. Zeroing may also be needed with mandatory time-stamp resetting for each new scene of a movie on a DVD. Accurate detection of discontinuities may improve reliability and performance of media playback operations such as duration estimation and time-seeking.

Discontinuity detection may include finding the byte position of sequential time-stamps separated by a significant difference. For example, an initial timestamp of five seconds may be followed by a subsequent time stamp of zero seconds. To find the discontinuity, equidistant check points may be distributed along the data stream. Temporal discontinuities are then searched for at each check point. This traditional method of discontinuity detection, however, may fail to recognize closely spaced discontinuities such as those located between the equidistant check points. Furthermore, in instances where there are relatively few discontinuities, the traditional method may fail to efficiently adapt to this condition by increasing the distance between checkpoints. This may result in a slower performance associated with the burden of continuing to distribute checkpoints at, for example, predetermined intervals despite the presence of relatively few discontinuities

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
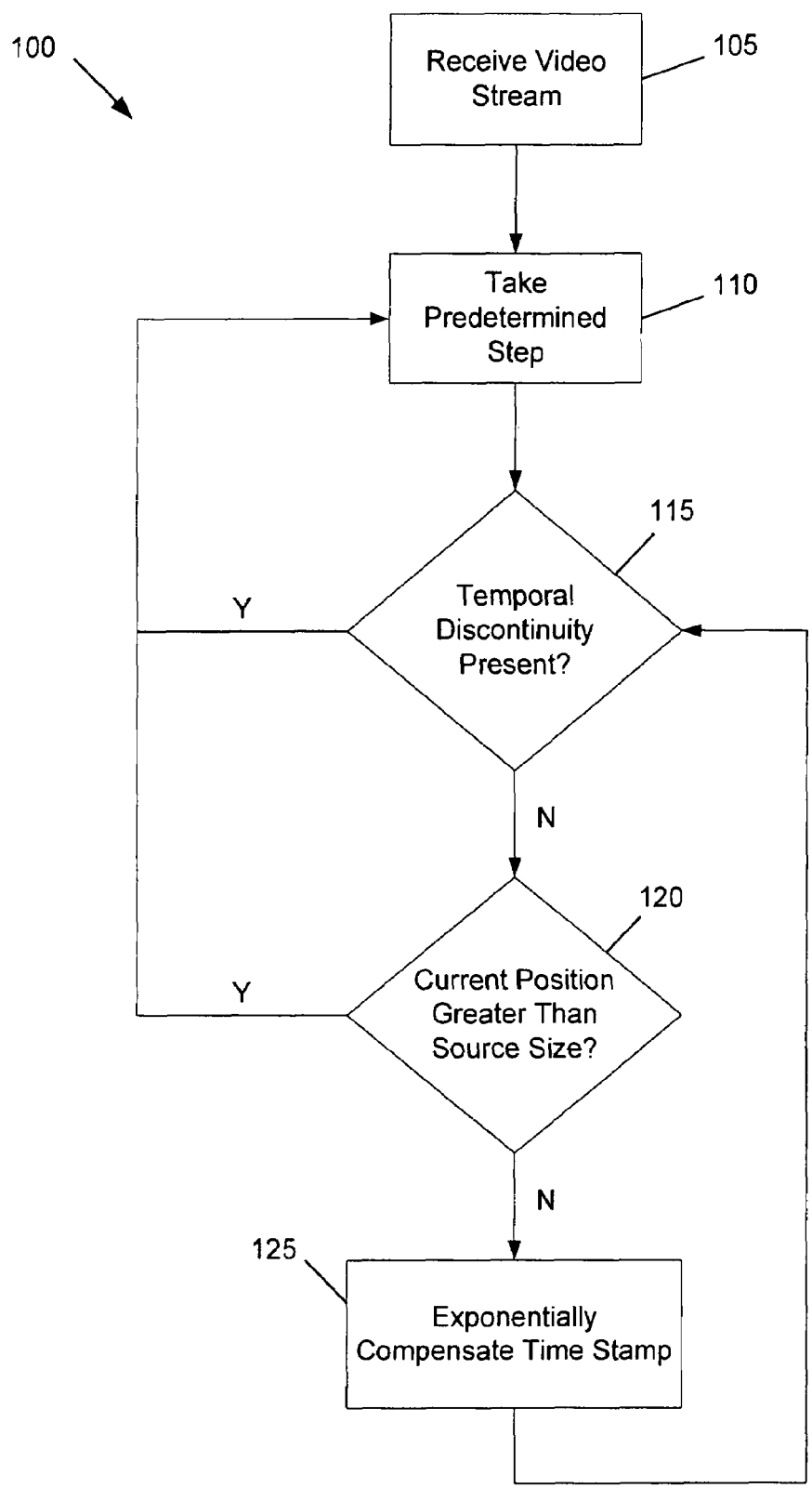
FIG. 1 is a flow chart for a method in accordance with one embodiment of the present invention.
Figure 2:
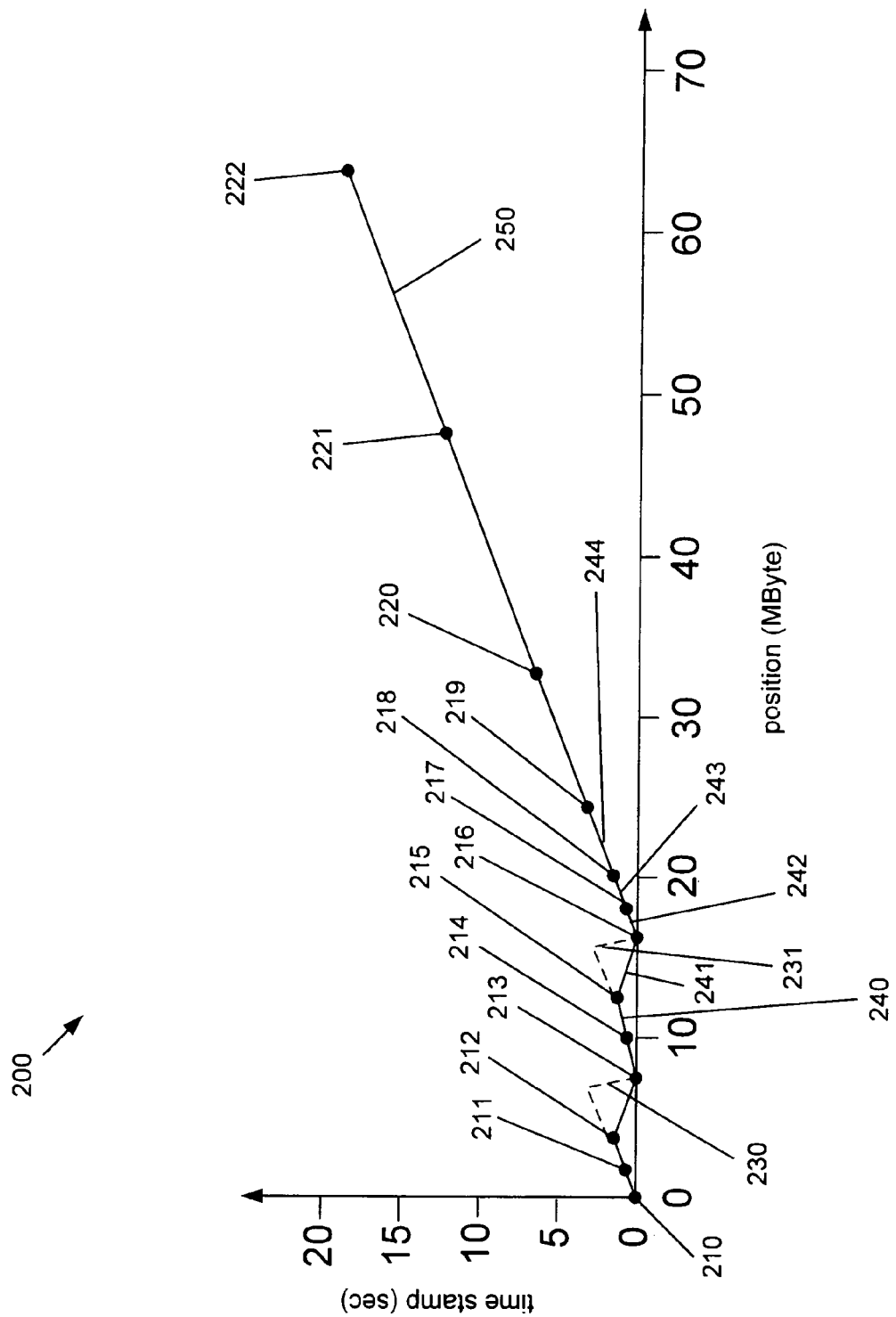
FIG. 2 is a graph representing treatment of a data stream in one embodiment of the present invention.

FIG. 1 is a flow chart 100 for a method for treatment of a data stream in accordance with one embodiment of the present invention. FIG. 2 is a graph 200 representing a corresponding treatment of the data stream 250. The immediately following references to "blocks" are references to FIG. 1. The immediately following references to checkpoints and other matters identified with 2XX series of numbers are references to FIG. 2.

In block 105, a video stream 250 is received. In an embodiment of the invention, the video stream is formatted as a MPEG2 data stream. The video steam 250 may be included in a data source of a predetermined size. For example, a data source may have a size of 64 Mbytes. In one embodiment of the invention, the data source size may be provided by the file system and/or operation system as a predetermined byte-length of a data stream. The video stream 250 may include temporal discontinuities 230, 231. The temporal discontinuities 230, 231 may be indicated by sequential time-stamps that are separated by a significant difference in time.

An initial checkpoint 210 is located at the beginning of the stream. In block 110, a predetermined step is taken, resulting in checkpoint 211. The predetermined step may be determined, in one embodiment of the invention, based on the source size and the desired number of checkpoints and intervals to be allocated to the source. Such design decisions may take into account performance considerations such as performance speed compared to resolution. Using a specific example to illustrate the issue, the initial step may be calculated as follows: initial step=source size/$2^{m-1}$, where m is the number of intervals. Thus, as seen in FIG. 2, the initial step may be 2 Mbytes based on a 64 Mbyte source size, seven checkpoints (216, 217, 218, 219, 220, 221, 222), and six intervals between or amongst the seven checkpoints.

In block 115, a determination is made as to whether a temporal discontinuity is present. Checkpoint 211 is not located at a temporal discontinuity. Thus, advancement is made to the next block. In block 120, a determination is made as to whether the source size has been exceeded. The source size (e.g., 64 Mbytes) has not been exceeded at checkpoint 211, which is located at 2 Mbytes.

Proceeding to block 125, a time stamp is exponentially compensated as will be explained more fully below. This results in checkpoint 212. After verifying that checkpoint 212 does not coincide with a discontinuity or the end of a source in respective blocks 115, 120, another checkpoint 213 is generated in block 125. Regarding exponential compensation, checkpoint 212 is determined based on the initial step of 2 Mbytes that resulted in checkpoint 211. More specifically, checkpoint 211 is determined based on (initial step size)*$2^0$, checkpoint 212 is determined based on (initial step size)*$2^1$, and checkpoint 213 is based on (initial step size)*$2^2$. In other words, in one embodiment of the invention, the location of certain checkpoints may be determined according to the following formula: (initial step size)*$2^{n-1}$, where n is the number of checkpoints past a starting point or discontinuity.

Still referring to FIG. 2, checkpoint 213 coincides with a discontinuity. A discontinuity may be detected by determining, for example, whether the difference in two sequential time stamps surpasses a predetermined threshold. After detection of the discontinuity, checkpoint 213 is treated as a beginning of a source and the method is restarted. Specifically, according to block 110, checkpoint 214 follows checkpoint 213 by a distance equal to an initial step. In a manner similar to that already set out above, if checkpoint 213 is located at, for example, 8 Mbytes, checkpoint 214 is located at 10 Mbytes, checkpoint 215 is located at 12 Mbytes, and checkpoint 216 is located at 16 Mbytes. Again, as determined in block 115, the discontinuity is located at 16 Mbytes and the method returns to block 110. Method 100, in one embodiment of the invention, results in further checkpoints 217, 218, 219, 220, and 221 located respectively at 18, 20, 24, 32, and 48 Mbytes. Checkpoints 217, 218, 219, 220, and 221 are determined based on the previously described formula: (initial step size)*$2^{n-1}$, where n is the number of checkpoints past a starting point or discontinuity. Checkpoint 222 is distributed at the end of the source. In one embodiment of the invention, the first checkpoint is located at the beginning of the data source and the last checkpoint is located at the end of the data source. The method 100 then repeats for further data.

Thus, a method and apparatus for detection and compensation of discontinuities in a data stream is described. Those of ordinary skill in the art will appreciate further embodiments of the invention identified in the pseudo-code found in the following tables.

TABLE 1

```
while (current_discontinuity_position < current_point_position) {
    // compensate time stamp
    current_point_time_stamp += current_discontinuity_time_gap;
    // go to next discontinuity
    current_discontinuity_position = next_discontinuity_position;
    current_discountinuity_time_gap = next_discontinuity_time_gap;
}
```

The above compensation algorithm may be employed in one embodiment of the invention when discontinuities have already been detected. The algorithm may include adding time gaps of all preceded discontinuities to a certain time-stamp.

TABLE 2

```
NUMBER_OF_INTERVALS =
NUMBER_OF_CHECK_POINTS - 1
if (is_exponential_algorithm)
    step = initial_step = source_size /
        (1 << (NUMBER_OF_INTERVALS - 1));
else
    step = source_size / NUMBER_OF_INTERVALS;
first = get_first_time_stamp( );
while(current_pos < source_size) {
    current_pos += step;
    set_position(current_pos);
    current_time = get_nearest_time_stamp( );
    if (is_exponential_algorithm)
        step = current_pos - last_discontinuity_pos; // increase step
    if (current_time < previous_time)
    {
        last_discontinuity_pos =
        find_exact_position_of_discontinuity( );
        if (is_exponential_algorithm)
            step = initital_step; // reset step to initial
    }
    previous_time = current_time;
}
last_time = current_time;
duration = last_time - first_time;
average_bitrate = source_size / duration;
```

The above linear/exponential compensation algorithm found in Table 2 may be employed in one embodiment of the invention when discontinuities have not already been detected. The algorithm takes into account the possibility of using a traditional linear algorithm to distribute checkpoints in a linear fashion with equidistant spacing. For example, a traditional linear algorithm may allot checkpoints every 10.66 Mbytes based on a 64 Mbyte source size divided by six intervals. Using FIG. 2 as an example, such a linear algorithm would place checkpoints at 0, 10.66, 21.32, and 31.98 Mbytes (not shown in FIG. 2). Thus, in this example the linear algorithm would "miss" the temporal discrepancies located at 8 and 16 Mbytes, whereas those same discrepancies would be identified using an exponential algorithm described above.

Furthermore, a discontinuity may be found using a number of different techniques such as, for example, checking adjacent time-stamps. If a preceding time-stamp is greater than following time-stamp, the exact position of the discontinuity is found.

Thus, a method is presented that, in one embodiment of the invention, distributes multiple checkpoints such as checkpoints 214, 215, and 216 in FIG. 2. A discontinuity is detected at checkpoint 216. Checkpoints 214, 215 are separated by interval 240. Checkpoints 215, 216 are separated by interval 241. Interval 241 is longer than interval 240. Checkpoints 216, 217 are separated by interval 242, checkpoints 217, 218 are separated by interval 243, and checkpoints 218, 219 are separated by interval 244. Interval 244 is longer than the interval 243. Interval 244 may equal the sum of intervals 242, 243. Subsequent checkpoints following a discontinuity may each be located at a distance equal to the distance between the immediately preceding check point and the beginning of a source (e.g., checkpoints 210, 213, 216). Interval 244 is exponentially longer than interval 243.

Thus, various embodiments of the invention concern an exponential distribution of check points along a media stream. The approach may increase reliability of discontinuity detection as compared to a linear algorithm. The approach may include use of a resolution that decreases (i.e., wider intervals) if fewer discontinuities are detected. The speed of executing the method may increase accordingly.

Various embodiments of the invention may be used in media infrastructure components such as hardware and software de-multiplexers, media parsers, and other vehicles that process media containers. The embodiments are suitable for, as examples only, audio, video, and mixed audio/video data streams.

Embodiments may be implemented in an algorithm that can be executed in many different system types. For example, embodiments may be implemented in computer systems such as server computers, personal computers, mobile devices such as cellular telephones and so forth. In such processor-based systems, an algorithm in accordance with an embodiment may be performed in a general-purpose processor such as a microprocessor, a graphics processing unit (GPU) or other such processing unit.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a data source of predetermined size containing a video stream, the video stream including a first temporal discontinuity;
   distributing a first checkpoint, a second checkpoint, and a third checkpoint along the video stream, the first and second checkpoints separated by a first interval, the second and third checkpoints separated by a second interval, and the second interval being longer than the first interval; and
   detecting the first temporal discontinuity at the third checkpoint.

2. The method of claim 1, further comprising determining the size of the first interval based on the predetermined size of the date source.

3. The method of claim 1, wherein the second interval is exponentially longer than the first interval.

4. The method of claim 1, further comprising distributing a fourth, a fifth, and a sixth checkpoint along the video stream after the third checkpoint, the third and fourth checkpoints separated by a third interval, the fourth and fifth checkpoints separated by a fourth interval, the fifth and sixth checkpoints separated by a fifth interval, and the fifth interval being longer than the fourth interval.

5. The method of claim 4, wherein there is no intervening checkpoint distributed between the third and the fourth checkpoints.

6. The method of claim 1, further comprising distributing a fourth, a fifth, and a sixth checkpoint along the video stream after the third checkpoint, the third and fourth checkpoints separated by a third interval, the fourth and fifth checkpoints separated by a fourth interval, the fifth and sixth checkpoints separated by a fifth interval, and the fifth interval equal to the sum of the third interval and fourth interval.

7. The method of claim 1, wherein there is no intervening checkpoint distributed between the first and the second checkpoints or the second and the third checkpoints.

8. An article comprising a non-transitory medium storing instructions that enable a processor-based system to:
   receive a data stream, the data stream to include a first temporal discontinuity;
   distribute a first checkpoint, a second checkpoint, and a third checkpoint along the data stream, the first and second checkpoints to be separated by a first interval, the second and third checkpoints to be separated by a second interval, and the second interval to be longer than the first interval; and
   detect the first temporal discontinuity at the third checkpoint.

9. The article of claim 8, wherein the size of the first interval is to be based on a predetermined size of a date source that includes the data stream.

10. The article of claim 8, wherein the second interval is to be exponentially longer than the first interval.

11. The article of claim 8, further storing instructions that enable the processor based-system to distribute a fourth, a fifth, and a sixth checkpoint along the data stream after the third checkpoint, the third and fourth checkpoints to be separated by a third interval, the fourth and fifth checkpoints to be separated by a fourth interval, the fifth and sixth checkpoints to be separated by a fifth interval, and the fifth interval to be longer than the fourth interval.

12. The article of claim 11, wherein there is no intervening checkpoint to be distributed between the third and the fourth checkpoints.

13. The article of claim 8, further storing instructions that enable the processor based-system to distribute a fourth, a fifth, and a sixth checkpoint along the data stream after the third checkpoint, the third and fourth checkpoints to be separated by a third interval, the fourth and fifth checkpoints to be separated by a fourth interval, the fifth and sixth checkpoints to be separated by a fifth interval, and the fifth interval to be equal to the sum of the third interval and fourth interval.

14. The article of claim 8, wherein there is no intervening checkpoint to be distributed between the first and the second checkpoints or the second and the third checkpoints.

15. The article of claim 8, wherein the data stream is to include a MPEG2 stream.

16. An apparatus comprising:
   a memory to receive a data source of predetermined size containing a video stream, the video stream including a first temporal discontinuity;
   a processor, coupled to the memory, to distribute a first checkpoint, a second checkpoint, and a third checkpoint along the video stream and to detect the first temporal discontinuity at the third checkpoint;
   wherein the first and second checkpoints are separated by a first interval, the second and third checkpoints are separated by a second interval, and the second interval is longer than the first interval.

17. The apparatus of claim 16, wherein the processor is to determine the size of the first interval based on the predetermined size of the date source.

18. The apparatus of claim 16, wherein the second interval is exponentially longer than the first interval.

19. The apparatus of claim 16, wherein the processor is to distribute a fourth, a fifth, and a sixth checkpoint along the video stream after the third checkpoint, the third and fourth checkpoints separated by a third interval, the fourth and fifth checkpoints separated by a fourth interval, the fifth and sixth checkpoints separated by a fifth interval, and the fifth interval being longer than the fourth interval.

20. The apparatus of claim 19, wherein there is no intervening checkpoint distributed between the third and the fourth checkpoints.

* * * * *